United States Patent [19]

Nettleton et al.

[11] Patent Number: 4,507,790

[45] Date of Patent: Mar. 26, 1985

[54] LASER SYSTEM WITH PARTITIONED PRISM

[75] Inventors: John E. Nettleton; Dallas N. Barr, both of Woodbridge, Va.

[73] Assignee: The United States of America as represented by the Secretary of the Army, Washington, D.C.

[21] Appl. No.: 481,431

[22] Filed: Apr. 1, 1983

[51] Int. Cl.³ .................. H01S 3/086; G02B 5/04
[52] U.S. Cl. ........................ 372/100; 350/6.5; 350/173; 350/286; 350/486; 356/334; 372/102
[58] Field of Search ............. 350/6.5, 170, 286, 484, 350/485, 486, 487, 173; 356/328, 334; 372/100, 102, 98, 99

[56] References Cited

U.S. PATENT DOCUMENTS 3,940,712  2/1976  White ................................ 372/100
4,425,648  1/1984  Holly ................................ 356/334

FOREIGN PATENT DOCUMENTS 0160091  4/1979  Netherlands ..................... 350/487

Primary Examiner—Bruce Y. Arnold
Assistant Examiner—William Propp
Attorney, Agent, or Firm—Anthony T. Lane; Robert P. Gibson; Aubrey J. Dunn

[57] ABSTRACT

An array of optical frequency-sensitive elements such as diffraction gratings or interference filters are arranged in a row, and the optical path of the laser cavity can be directed to include one of these elements. A partitioned optical prism consisting of a triangular portion and one or more paralleogramatic portions are used to direct the path. Between the portions are piezoelectric elements which, when energized, expand to provide an air gap between the portions and to allow total reflection of an optical ray at the surface of the prism next to the gap.

5 Claims, 1 Drawing Figure

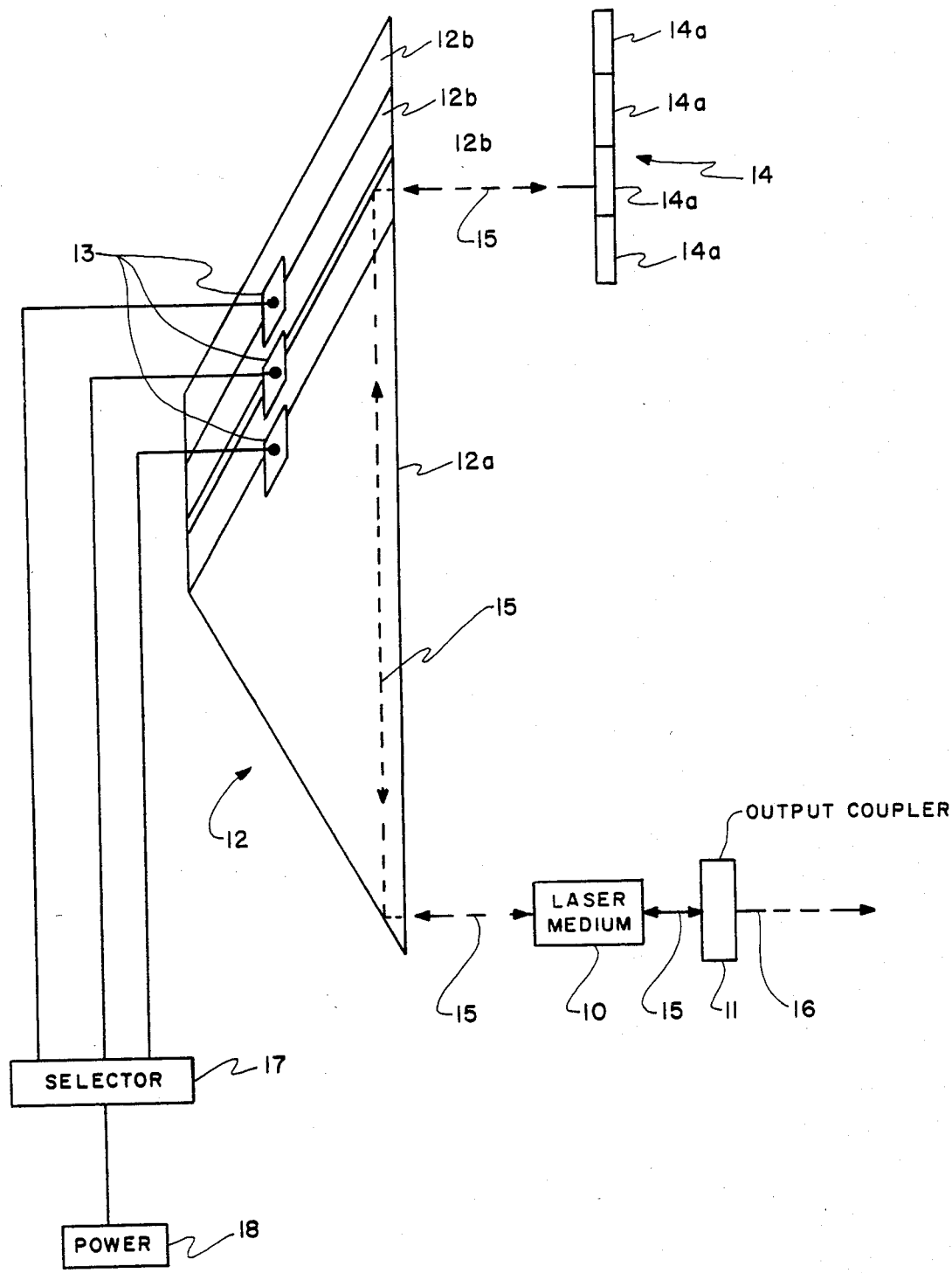

LASER SYSTEM WITH PARTITIONED PRISM

The invention described herein may be manufactured, used and licensed by the U.S. Government for governmental purposes without the payment of any royalties thereon.

BACKGROUND OF THE INVENTION

This invention is in the field of spectral line selectors for lasers. The usual solid or gaseous laser, unless suppression or enhancement measures are taken, has multiple spectral lines. These lines are determined, among other things, by the physical length of the laser cavity. In order to select a particular line, one must introduce some frequency-sensitive optical element into the optical cavity. Typical example of such an element are an interference filter and a diffraction grating. The filter or grating may be replaced to select a particular spectral line or may be tilted with respect to the optical path. Obviously, replacement is a very slow arrangement and is normally only used wheninfrequent changes are made. Tilting of the filter or grating, although capable of being performed at high speeds, has its own problems. Specifically, tuning is continuous instead of random, and requires that one pass through all intermediate lines between the current and desired lines, and requires a complex feedback system for determining when the desired line is reached. The instant invention obviates these problems.

SUMMARY OF THE INVENTION

The invention is a laser system capable of providing a particular one of various spectral output lines. The system includes an array of frequency or wavelength-sensitive elements such as interference filters or diffraction gratings in the laser optical cavity. The particular desired one of these elements is selected by deflecting the optical path in the cavity; deflection is done by a partitioned totally-reflecting prism. The prism has two or more portions moveable with respect to each other by one or more piezoelectric, electrostrictive, or magnetostrictive devices. The devices are electrically energized to change length and to thus move the portions apart. Obviously, the devices may operate at high speeds, and with a relatively simple selection circuit.

BRIEF DESCRIPTION OF THE DRAWING

The single drawing FIGURE is a schematic showing of the invention.

DESCRIPTION OF PREFERRED EMBODIMENT

The invention might be best understood when this description is taken in conjunction with the drawing. In the drawing, numeral 10 designates the laser active medium, and 11 designates the output coupler for the laser. This output coupler may be the usual 85% reflective mirror, Q-switch, or other such known means. Included in the optical cavity we also see partioned prism 12 and diffraction grating or interference filter array 14. The prism consists of a triangular cyclinder portion 12a and parallelogramatic cylinder portions 12b. Between each of these portions is a piezoelectric (or equivalent) member or device 13. These piezoelectric members, when energized by the proper voltage, expand in length such that a gap is established between the two portions of 12 to which the members are attached. As shown in the drawing, the middle one of members 13 is energized to establish a gap between two of portions 12b. When ray 15 reaches this gap, it is totally reflected and strikes the middle one of elements 14a of array 14. The particular one of members 13 which is energized is determined by selector 17 connected to power supply 18. The power supply is a voltage source of sufficient potential to cause the desired elongation of any member 13 when applied thereto. Selector 17 need be nothing more than a selector switch.

In order for total reflection to occur at a prism surface, it is only necessary that the gap as provided by member 13 be greater than 10% of the wavelength of ray 15 and that the other known conditions for total reflection are true. Ray 15 thus follows a path in the optical cavity of the laser which is determined by which one of the members 13 is energized; the ray will be retroreflected from a particular one of elements 14a. These elements are made for the different spectral lines which the laser normally provides. The wavelength of output ray 16 is therefore determined by which of elements 14a is in the optical cavity.

We claim:

1. A system for choosing a particular spectral line from a multi-line laser, wherein:
    said laser includes an optical cavity with a laser medium therein, and said optical cavity is defined in part by an output coupler;
    a plurality of frequency-sensitive retroreflectors;
    a partitioned prism in said optical cavity for directing a laser beam in said cavity onto a particular one of said retroreflectors, whereby said particular retroreflector further defines said optical cavity and allows lasing at only a particular frequency.

2. The system as set forth in claim 1 wherein said prism includes at least one portion which is in the shape of a triangular cylinder, and at least one other portion which is in the shape of a parallelogramatic cylinder and is normally contacting the one portion.

3. The system as set forth in claim 2 further including means for establishing a gap between said portions.

4. The system as set forth in claim 3 wherein said frequency-sensitive retroreflectors are reflective diffraction gratings or interference filters.

5. The system as set forth in claim 2 wherein said frequency-sensitive retroreflectors are reflective diffraction gratings or interference filters.

* * * * *